(12) United States Patent
Kumamoto et al.

(10) Patent No.: US 6,341,421 B1
(45) Date of Patent: Jan. 29, 2002

(54) PRODUCTION METHOD OF POROUS STATIC-PRESSURE AIR BEARING

(75) Inventors: Satoshi Kumamoto, Mishima; Masahiko Fukuta, Numazu, both of (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,415

(22) Filed: Apr. 7, 2000

(30) Foreign Application Priority Data

Apr. 8, 1999 (JP) ............................ 11-100801

(51) Int. Cl.[7] ............................... B21D 53/10
(52) U.S. Cl. ................. 29/898.02; 29/898.13; 29/458; 29/530; 29/527.2; 451/52; 384/109; 384/902
(58) Field of Search ............... 29/898, 898.02, 29/898.12, 898.13, 557, 447, 458, 527.1, 527.2, 530, 407.01, 407.05, 890.142, 890.143; 156/268, 283, 304.1, 320, 321, 583.1; 451/52, 49, 51; 384/100, 109, 902

(56) References Cited

U.S. PATENT DOCUMENTS

| | | | |
|---|---|---|---|
| 3,693,750 A | * | 9/1972 | Takkunen ............... 181/33 G |
| 4,208,472 A | * | 6/1980 | Cho et al. ................. 428/550 |
| 4,254,588 A | * | 3/1981 | Omoda et al. ............. 51/291 |
| 4,567,695 A | * | 2/1986 | Schaeffler ................. 51/291 |
| 5,012,853 A | * | 5/1991 | Bihlmaier ................. 164/75 |
| 5,025,595 A | * | 6/1991 | Orain ........................ 51/291 |
| 5,218,764 A | * | 6/1993 | Suzuki ................... 29/898.066 |
| 5,505,248 A | * | 4/1996 | Aghajanian et al. ......... 164/97 |
| 5,549,394 A | * | 8/1996 | Nowak et al. ............. 384/282 |
| 5,711,074 A | * | 1/1998 | Harimoto et al. ....... 29/898.066 |
| 5,772,494 A | * | 6/1998 | Muraki et al. ............. 451/52 |
| 5,866,518 A | * | 2/1999 | Dellacorte et al. ........ 508/104 |
| 6,105,250 A | * | 8/2000 | Tanaka et al. ........... 29/898.02 |
| 6,119,346 A | * | 9/2000 | Miyasaka et al. ........ 29/898.02 |

FOREIGN PATENT DOCUMENTS

| | | |
|---|---|---|
| JP | 06-297421 | 10/1994 |
| JP | 2000-9141 | 1/2000 |

* cited by examiner

Primary Examiner—S. Thomas Hughes
Assistant Examiner—Marc Butler

(57) ABSTRACT

Metal powder is filled in a through-hole of a base member and a base porous body is formed by bonding the metal powder with each other and by bonding the metal powder to the base member so that an end surface on a bearing surface of the metal powder filled in the through hole is dented toward a compressed gas supply surface and at least a part of end surface on the compressed gas supply surface of the metal powder filled in the through-hole is dented toward the bearing surface. Subsequently, surface layer powder having smaller diameter than the metal powder is filled in the recess on the bearing surface to form a surface layer porous material layer by bonding the surface layer powder with each other and by bonding the surface layer powder to the base porous body 12 and the base member 10. The bearing surface is finished by removing face layer of the surface porous material layer by machining.

9 Claims, 2 Drawing Sheets

PRODUCTION METHOD OF POROUS STATIC-PRESSURE AIR BEARING

BACKGROUND OF THE INVENTION

1. Field of the Invention

The present invention relates to a porous static-pressure air bearing. More specifically, it relates to a production method for producing a two-layered porous static-pressure air bearing with high rigidity and without dispersing the quality thereof.

2. Description of Related Art

Conventionally, static-pressure air bearing has been used for highly accurate sliding component of machine tools etc. The static-pressure air bearing blows gas such as air to the sliding component to support load between mutually sliding mechanical components by film of the gas, thus securing smooth slidability between the components.

Porous material has been used as a nozzle for blowing the gas as well as various known gas nozzle, since the porous material is suitable for the static-pressure air bearing because air jet can be equally distributed to a predetermined area.

In the above porous static-pressure air bearing using the porous body, a porous body having a bearing surface for blowing compressed gas such as air from the bearing surface to support the member to be supported and a base member for supporting the porous body have to be mutually bonded at a strength capable of sustaining air-supply pressure and have to be sealed so that the gas does not leak through the space between the porous body and the base member.

For obtaining the above adhesion strength and sealability, shrink fitting, internal chilling and screw fitting have been used for bonding the porous body to the base member. The shrink fitting has been practically used for bearing of machine tool spindle, where cylindrical porous graphite is shrink-fitted to steel base member. The internal chilling is made into practical use in a slider for linear guiding, in which ceramic mold slurry is immersed into porous foaming material composed of polyvinyl formal (PVF) etc. and the porous foaming material is internally chilled by the same ceramic mold slurry Japanese Patent Laid-Open Publication No. Hei 6-297421).

Further, the porous static-pressure air bearing has a vacancy only adjacent to the bearing side surface having smaller diameter than the diameter of the vacancy of a lower portion, for preventing generation of pneumatic hammer (self-induced vibration) caused by compressibility of gas at gas pool on terminal constriction or for excluding ununiformity of distribution of diameter and vacancy of the porous body to optimize flow rate of the compressed gas blown out from the bearing surface.

Conventionally, for narrowing the diameter of the hole adjacent to the bearing surface side, various methods are proposed, in which resin is immersed, plating is conducted or another porous layer having smaller vacancy diameter is provided to the bearing surface side of the porous body.

Incidentally, for attaching the porous body to the base member, since the shrink fitting uses frictional force for adhesion, great bonding force is difficult to be obtained unless the porous body has a large area for causing frictional force, in other words, unless the porous body has a configuration elongated in shrink fitting direction. Accordingly, the shrink fitting is not suitably used for thin shape object and thickness of the porous body to be fitted is restricted. The internal chilling has many complicated production process such as defoaming and drying, which results in longer production cycle and higher production cost. The screw fitting requires much trouble for machining the screw, which results in higher production cost, and the screw fitting is inferior in sealability.

For narrowing the diameter of the hole adjacent to the bearing surface side, immersion amount of the resin for obtaining the desired hole diameter and plating amount is difficult to be controlled in processes for immersing the resin and conducting the plating. When another porous material layer having smaller vacancy diameter is provided, the porous body as the base member is processed in a predetermined configuration and the other porous material layer is mounted thereon, thus complicating the production process.

SUMMARY OF THE INVENTION

An object of the present invention is to provide a production method of porous static-pressure air bearing for facilitating production of two-layered porous static-pressure air bearing and for securely bonding the porous body to the base member with great strength and with improved sealability.

For attaining the above object, the present invention includes following arrangement:

A production method of porous static-pressure air bearing having a bearing surface and a compressed gas supply surface opposite to the bearing surface according to the present invention includes following steps of: filling a through-hole provided on a base member with metal powder; bonding the metal powder with each other by thermal treatment and simultaneously bonding the metal powder to the base member to form a base porous body so that end surface on the bearing surface side of the metal powder filled in the through-hole forms a recess dented toward the compressed gas supply surface and at least a part of end surface on the compressed gas supply surface of the metal powder forms a recess dented toward the bearing surface; filling recess on the bearing surface with surface layer powder having smaller diameter than the metal powder; bonding the surface layer powder with each other and simultaneously bonding to the base porous body and the base member to form a surface porous material layer; and removing a face layer of the surface porous material layer by machining work to form the bearing surface.

According to the above production method, the base porous body can be formed only by filling the metal powder into the through-hole provided to the base member and by conducting thermal treatment to the metal powder. Further, since the base porous body is bonded to the base member metallurgically, the base porous body is strongly adhered to the base member and has good sealability. Further, since both of the gas supply surface and the bearing surface of the base porous body are formed into a predetermined shape simultaneously with being made into the porous body by the thermal treatment, no machining work is necessary for the base porous body. The surface porous material layer as the second layer is formed by filling the recess on the bearing surface with the surface layer powder having diameter smaller than the metal powder and by simultaneously bonding the surface layer powder with the base porous body and the base member. The surface porous material layer is made into the porous body in any manner in accordance with the material of the surface layer powder. Thermal treatment as well as bonding by the binder can be used in the same manner as the base porous body, thus obtaining sufficient bonding strength and sealability thereby. Further, only the face layer of the surface porous material layer is necessary to be machined.

The metal powder forming the base porous body may be at least one selected from the group consisting of at least one of bronze, brass and hard aluminum.

Solid lubricant bonded by a binder may preferably be used for the powder forming the surface porous material layer.

In the above arrangement, the face layer of the surface porous material layer may be machined by any one of grinding, lapping and carving with use of monocrystalline diamond bit.

The solid lubricant may be at least one selected from the group consisting of molybdenum disulfide, boron nitride and carbon.

Alternatively, the brittle material bonded by a binder may be used as the surface layer powder forming the surface porous material layer.

In the above arrangement, the face layer of the surface porous material layer may be machined by either one of grinding or lapping.

Ceramic may preferably be used as the brittle material.

A face layer of the base member may be removed simultaneously with removing the face layer of the surface porous material layer by machining.

Flow rate of compressed gas blown out from the bearing surface may be set at a predetermined level by controlling machining amount of the surface porous material layer.

The machining amount of the surface porous material layer may preferably be controlled by measuring the flow rate of the compressed gas blown out from the bearing surface through the surface porous material layer while supplying the compressed gas to a compressed gas supply surface side of the surface porous material layer through the base porous body simultaneously with machining.

BRIEF DESCRIPTION OF THE DRAWINGS

FIG. 1(*b*) is a cross section taken along 2—2 line in FIG. 1(*a*);

DETAILED DESCRIPTION OF PREFERRED EMBODIMENT(S)

Figure 1A:
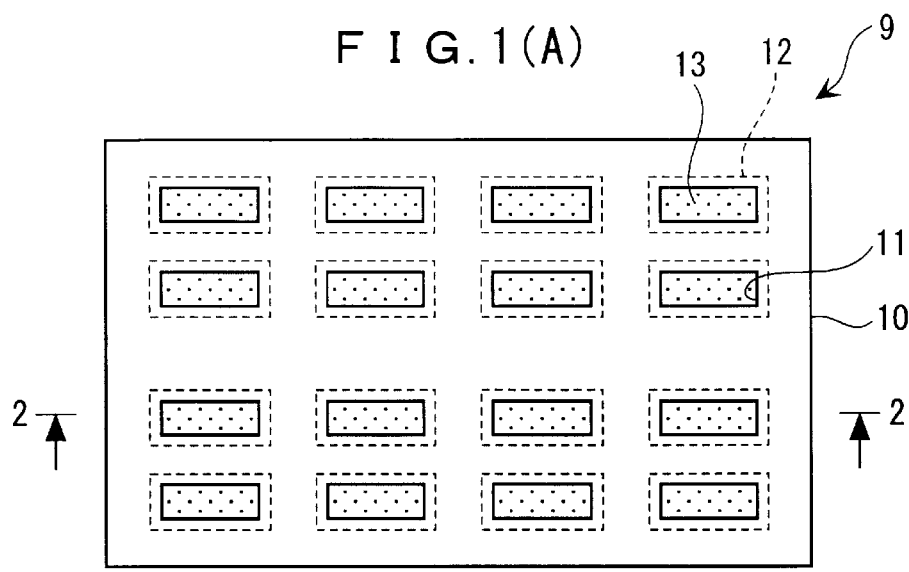
FIG. 1(*a*) is a plan view showing an embodiment of the present invention.

An embodiment of the present invention will be described below with reference to FIG. 1(*a*), FIG. 1(*b*) and FIG. 4. FIG. 1(*a*) and FIG. 1(*b*) show porous static-pressure air bearing 9 produced according to the present embodiment, in which FIG. 1(*a*) is plan view and FIG. 1(*b*) is cross section taken along 2—2 line of FIG. 1(*a*).

In FIG. 1(*a*) and 1(*b*), a base member 10 is a plate-shaped member formed of stainless steel or steel for machine construction and has a plurality of through-hole 11 penetrating top and bottom surface thereof.

Base porous body 12 made of below-described metal powder formed into porous body by thermal treatment is provided on the lower portion except for a part of upper end (lower and upper refer and similar terminology used in the present embodiment only refer to a direction in respective drawings, which is the same hereinafter) of the through-holes 11. On the upper end of the through-holes 11, a surface porous material layer 13 made into a porous body by boding surface layer powder having smaller diameter than the above metal powder, is provided.

The base porous body 12 and the surface porous material layer 13 form two-layered porous static-pressure air bearing and compressed gas is supplied from a flow path (not shown) to a ventilating concave portion 14 provided on the lower surface of the base porous body 12, thus non-contactly supporting a member to be supported (not shown) disposed on the upper surface (which is to be a bearing surface) of the base member 10.

Incidentally, the through-hole 11 has a portion for the base porous body 12 to be bonded and held that is configured into stepped hole with two stages with larger bottom and smaller top, thus sustaining pressure of the compressed gas to be supplied to the concave portion 14.

Figure 2:
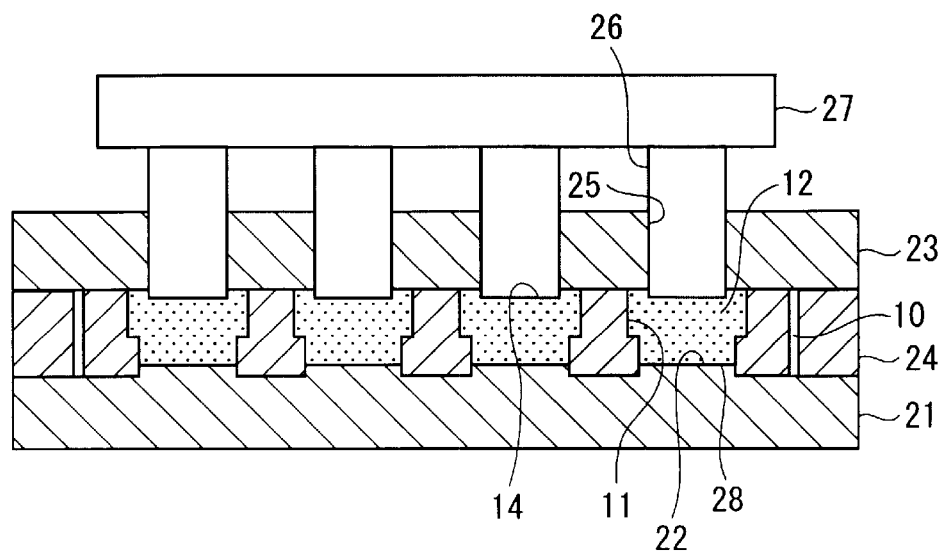
FIG. 2 is a cross section illustrating production of base porous body in the aforesaid embodiment.

FIG. 2 shows a process for forming the aforesaid base porous body 12.

In the figure, the base member 10 is disposed on a lower die 21 in a reverse manner as in the aforesaid FIG. 1(*b*). A convex portion 22 having cross section coincident with cross sectional configuration of upper end (narrower side) of the through-hole 11 in FIG. 1(*b*) is provided on an upper side of the lower die 21, the convex portions 22 being fitted to the upper end of the through hole 11 of the base member 10.

An upper die 23 is fixed on the base member 10 through a fixing spacer 24. The upper die 23 has a plurality of guide hole 25 that is opened on a center of the respective through-holes of the base member 10 and has cross section corresponding to the ventilating concave portions 14 shown in FIG. 1 (*b*). A plunger 26 having cross section respectively corresponding to the ventilating concave portion 14 is elevatably inserted into the guide holes 25 and a weight 27 is put on the plunger 26.

Incidentally, a surface of the convex portion 22 of the lower die 21, a lower surface of the upper die 23 in FIG. 2 and an end surface and outer circumference of the plunger 26 are conducted with wetting prevention process such as ceramic thermal spraying or alternatively, the lower die 21, the upper die 23 and the plunger 26 are formed of a material having no wettability such as ceramic in order not to be bonded to the metal powder of the material of the base porous body 12 during below-described sintering molding process.

The base porous body 12 is molded by removing the weight 27 and the plunger 26 and filling metal powder as the material of the base porous body 12 into the guide holes 25 of the upper die 23 and the through-hole 11 with the lower end being closed by the concave portion 22 of the lower die 21 in FIG. 2. The metal powder is also referred with the reference numeral 12. The metal powder 12 is filled by a predetermined amount more than the volume of the through-hole 11 in consideration of contraction by the thermal treatment of below-described sintering process.

Subsequently, the plunger 26 is inserted into the guide holes 25 and the weight 27 is put, which are put into a heating furnace (not shown) for sintering molding of the base porous body 12. The sintering molding itself is conducted with use of known method, in which, for instance, the metal powder is heated to a temperature 50 to 100 degrees lower than the melting point thereof. At this time, though the metal powder 12 is contracted in accordance with progress of the sintering process, the contraction is compensated by lowering the plunger 26 pressurized by the weight 27 to fill the through-hole 11 of the base member 10. When the plunger 26 is lowered in accordance with progress of the sintering process and the lower end of the plunger 26 enters into the though-holes 11 by a predetermined degree as shown in FIG. 2, the sintering process is terminated and the members are cooled in the furnace.

When the base porous body 12 is sintered to be molded, the base porous body 12 and the base member 10 is metallically bonded by diffusion, thus strongly bonding the base porous body 12 to the base member 10. Incidentally, any one of bronze, brass and hard aluminum is suitably used as the metal powder for forming the base porous body in view of easiness in molding the base porous body 12, required strength and bonding property with the base member 10 by diffusion.

Figure 1B:
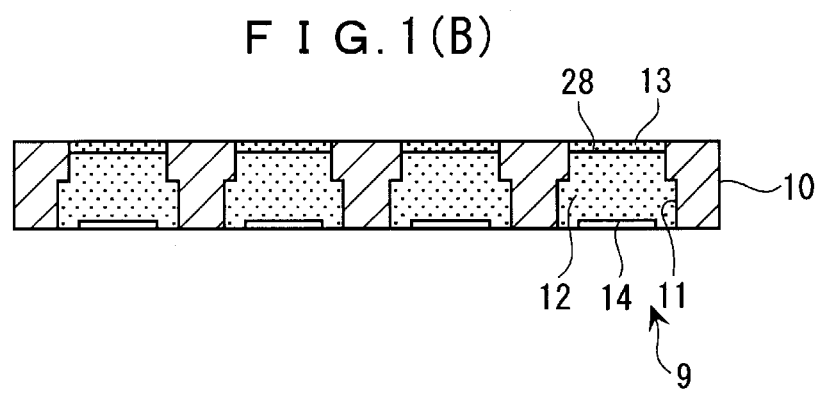

After completion of molding the base porous body 12, the weight 27, the plunger 26, the upper die 23, the fixing spacer 24 and the lower die 21 is detached from the base member 10 to form a surface porous material layer 13 provided on the upper end of the through-hole 11 in FIG. 1(b) in the concave portion 28 on the lower end of the through-hole 11 of the base member 10 for the convex portion 22 of the lower die 21 to be fitted in FIG. 2. At this time, since the exposed surface of the base porous body 12 touching the lower die 21, the upper die 23 and the plunger 26 is capable of ventilating, the surface porous material layer 13 can be formed immediately without machining the surface.

Figure 3:
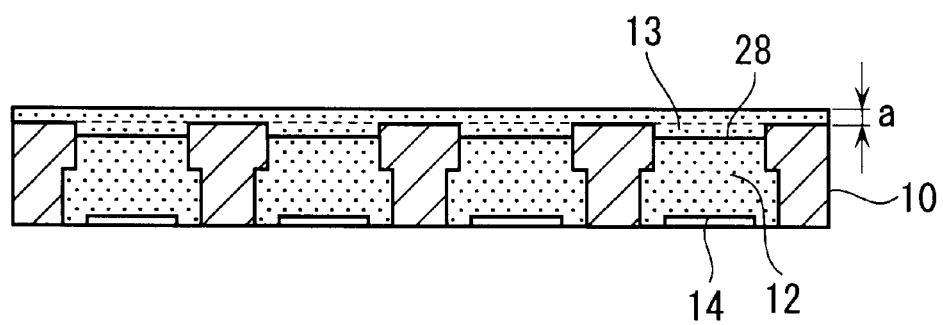
FIG. 3 is a cross section illustrating production in process in the aforesaid embodiment.

As shown in FIG. 3, the surface porous material layer 13 is formed by turning the base member 10 upside down in FIG. 2 and filling the concave portion 28 with a material for letting powder having smaller diameter than the metal powder forming the base porous body 12 be bonded with each other to be a porous body. The surface porous material layer 13 may be formed by sintering process in the same manner as the base porous body 12. However, in order to avoid deformation and change of properties of the base member 10 and the base porous body 12 by heating, solid lubricant such as molybdenum disulfide, boron nitride and carbon bonded by a binder requiring no high-temperature heating, and powder of brittle material such as ceramics bonded by the binder (which is also referred with the reference numeral 13) are preferably used.

FIG. 3 shows an example of filling the solid lubricant or brittle material 13 bonded by a binder within the concave portion 28 by coating, where the solid lubricant or the brittle material 13 bonded by the binder fills the concave portion 28 and coats the surface of the base member 10 by a thickness a.

The surface porous material layer 13 formed by the coating process is machined so that the surface material layer 13 is completely removed from at least the surface of the base member 10 and the surface porous material layer 13 is left only in the concave portion 28, thus being made into a product.

At this time, in order not to crush pores of the porous body, the surface porous material layer 13 is machined by any one of grinding, lapping and carving by a monocrystalline diamond bit when the surface porous material layer 13 is formed of a solid lubricant bonded by binder, and the surface porous material layer 13 is machined by either one of grinding or lapping when the surface porous material layer 13 is formed of brittle material bonded by the binder.

Figure 4:
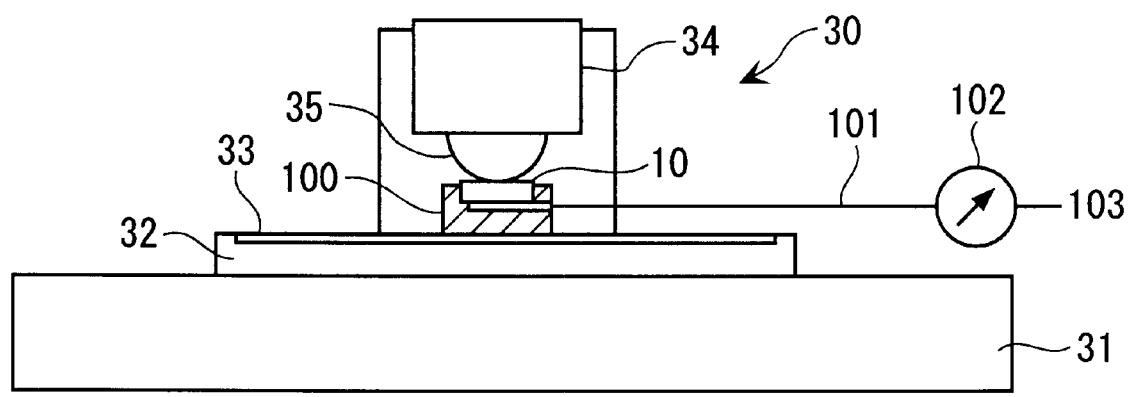
FIG. 4 shows an example for a machining surface porous material layer in the aforesaid embodiment.

FIG. 4 shows an example where the machining is conducted by grinding. An intermediate product 100 is formed with the base member 10 shown in FIG. 3 being attached, which is at one stage before the porous static-pressure air bearing 9 as a final product.

An air-supply pipe 101 for supplying compressed gas to the ventilating concave portion 14 is connected to the intermediate product 100. A flowmeter 102 is connected at an intermediary of the ventilating air-supply pipe 101, and the compressed gas is supplied from a compressed gas source 103.

The intermediate product 100 is attached to a chuck 33 of a table 32 reciprocating in right and left direction on a base 31 of a grinding machine 30. The surface porous material layer 13 shown in FIG. 3 is ground by a rotary grindstone 35 attached to a grinding head 34 of which position is vertically controlled.

At this time, compressed gas is supplied from the compressed gas source 103 after completely removing the surface porous material layer 13 at least from the surface of the base member 10. The supplied compressed gas flows from the ventilating concave portion 14 shown in FIG. 1(b) through the base porous body 12 to be blown out from the surface of the surface porous material layer 13, in other words, from the bearing surface.

Flow rate of the compressed air blown out from the bearing surface is measured by the flowmeter 102. The flow rate blown out from the bearing surface increases as the thickness of the surface porous material layer 13 becomes small. Accordingly, desired property of the porous static-pressure air bearing can be obtained by grinding the surface porous material layer for one to several times so that the flow rate of the compressed gas blown out from the bearing surface reaches a predetermined value. At this time, the surface of the base member 10 is ground simultaneously with the surface of the surface porous material layer 13, which is formed as a portion of the bearing surface.

According to the present embodiment, the two-layered porous static-pressure air bearing can be easily manufactured, and the porous body can be bonded to the base member securely and strongly, thus improving the sealability of the porous static-pressure air bearing.

Incidentally, the scope of the present invention is not restricted to the aforesaid embodiment, but includes following modifications.

For instance, the through-hole of the base member 10 may have any configuration, dimension and number. Further, the configuration, dimension, thickness of respective layers and density of the porous static-pressure air bearing 9 formed in the through-hole 11 may be defined at will, which can be set in accordance with a condition required for the product.

For instance, when the porous static-pressure air bearing 9 is applied to a flat slide surface, the porous static-pressure air bearing 9 may be formed in flat shape. However, when the porous static-pressure air bearing is used for a radial bearing of a shaft, the porous static-pressure air bearing 9 may be ground in a cylindrical shape corresponding to the surface of the spindle to be supported.

What is claimed is:

1. A production method of forming a porous static-pressure air bearing having a bearing surface and a compressed gas supply surface opposite to the bearing surface, comprising the steps of:

filling a through-hole provided on a base member with metal powder;

bonding the metal powder by thermal treatment and simultaneously bonding the metal powder to the base member to form a base porous body so that an end surface on a bearing surface side of the metal powder filled in the through-hole forms a recess, on the bearing surface, dented toward the compressed gas supply surface, and at least a part of an end surface on a compressed gas supply surface side of the metal powder forms a recess, on the compressed gas supply surface, dented toward the bearing surface;

filling the recess on the bearing surface with surface layer powder having a smaller diameter than the metal powder;

bonding the surface layer powder and simultaneously bonding the surface layer powder to the base porous body and the base member to form a surface porous material layer; and removing a face layer of the surface porous material layer by machining work to form the bearing surface.

2. The production method of forming a porous static-pressure air bearing according to claim 1, wherein the metal powder forming the base porous body is at least one selected from the group consisting of bronze, brass and hard aluminum.

3. The production method of forming a porous static-pressure air bearing according to claim 1, wherein solid lubricant bonded by a binder is used for the powder forming the surface porous material layer, and wherein the face layer of the surface porous material layer is machined by any one of grinding, lapping and carving with use of monocrystalline diamond bit.

4. The production method of forming a porous static-pressure air bearing according to claim 3, wherein the solid lubricant is at least one selected from the group consisting of molybdenum disulfide, boron nitride and carbon.

5. The production method of forming a porous static-pressure air bearing according to claim 1, wherein brittle material bonded by a binder is used as the surface layer powder forming the surface porous material layer, and wherein the face layer of the surface porous material layer is machined by either one of grinding or lapping.

6. The production method of forming a porous static-pressure air bearing according to claim 5, wherein ceramic is used as the brittle material.

7. The production method of forming a porous static-pressure air bearing according to claim 1, wherein a face layer of the base member is removed simultaneously with removing the face layer of the surface porous material layer by machining.

8. The production method of forming a porous static-pressure air bearing according to claim 7, wherein flow rate of compressed gas blown out from the bearing surface is set at a predetermined level by controlling machining amount of the surface porous material layer.

9. The production method of forming a porous static-pressure air bearing according to claim 8, wherein the machining amount of the surface porous material layer is controlled by measuring the flow rate of the compressed gas blown out from the bearing surface through the surface porous material layer while supplying the compressed gas to a compressed gas supply surface side of the surface porous material layer through the base porous body simultaneously with machining.

* * * * *